United States Patent [19]

Boissonnat et al.

[11] Patent Number: 5,358,680
[45] Date of Patent: Oct. 25, 1994

[54] PROCESS FOR MANUFACTURING A COMPOSITE PRODUCT BY MOULDING

[75] Inventors: Philippe Boissonnat, Barby; Dominique Loubinoux, Chambery; Giordano Roncato; Robert Fedorowsky, both of Aix les Bains; Guy Zanella, Cognin, all of France

[73] Assignee: Vetrotex France, Chambery, France

[21] Appl. No.: 973,124

[22] Filed: Nov. 6, 1992

[30] Foreign Application Priority Data

Nov. 8, 1991 [FR] France .................. 91 13773

[51] Int. Cl.⁵ .......................................... B29B 7/90
[52] U.S. Cl. .......................... 264/177.2; 264/211; 264/211.23; 264/328.18; 264/349; 264/DIG. 69; 425/204
[58] Field of Search ............... 264/211, 174, 349, 108, 264/37, 176.1, 328.18, 177.2, DIG. 69, 211.23; 425/205, 202, 204

[56] References Cited

U.S. PATENT DOCUMENTS

| 2,877,501 | 3/1959 | Bradt ..................... 264/328.18 |
| 3,304,282 | 2/1967 | Cadus et al. . |
| 3,409,711 | 11/1968 | Pashak et al. ............. 264/349 |
| 3,577,494 | 5/1971 | Chisholm et al. .......... 264/349 |
| 3,732,345 | 5/1973 | Amos et al. .............. 264/349 |
| 4,260,568 | 4/1981 | Warzel ..................... 264/37 |
| 4,616,989 | 10/1986 | Mewes et al. . |
| 4,848,915 | 7/1989 | Fintel ..................... 264/349 |
| 4,897,233 | 1/1990 | Bier et al. ................ 264/257 |
| 5,011,523 | 4/1991 | Roncato et al. . |
| 5,106,564 | 4/1992 | Iwanami et al. ........... 264/349 |

FOREIGN PATENT DOCUMENTS

| 0033244 | 8/1981 | European Pat. Off. . |
| 0138294 | 4/1985 | European Pat. Off. . |
| 0182335 | 5/1986 | European Pat. Off. . |
| 0367661 | 5/1990 | European Pat. Off. . |
| 2420686 | 11/1974 | Fed. Rep. of Germany ...... 264/349 |
| 3523661 | 1/1987 | Fed. Rep. of Germany ...... 425/202 |
| 2084596 | 12/1971 | France . |
| 2097191 | 3/1972 | France . |
| 49-42667 | 11/1974 | Japan ..................... 264/328.18 |
| 57-8139 | 1/1982 | Japan ..................... 264/349 |
| 59-227409 | 12/1984 | Japan ..................... 264/174 |
| 1295196 | 11/1972 | United Kingdom . |
| 1330395 | 9/1973 | United Kingdom . |

Primary Examiner—Jeffery Thurlow
Attorney, Agent, or Firm—Pennie & Edmonds

[57] ABSTRACT

The process of manufacturing a thermoplastic organic material containing reinforcing fibers and optionally mineral materials and organic additives by combining the fibers and materials in an extruder, and introducing at least some of the organic material into the extruder in the form of continuous filaments or fibers.

18 Claims, 1 Drawing Sheet

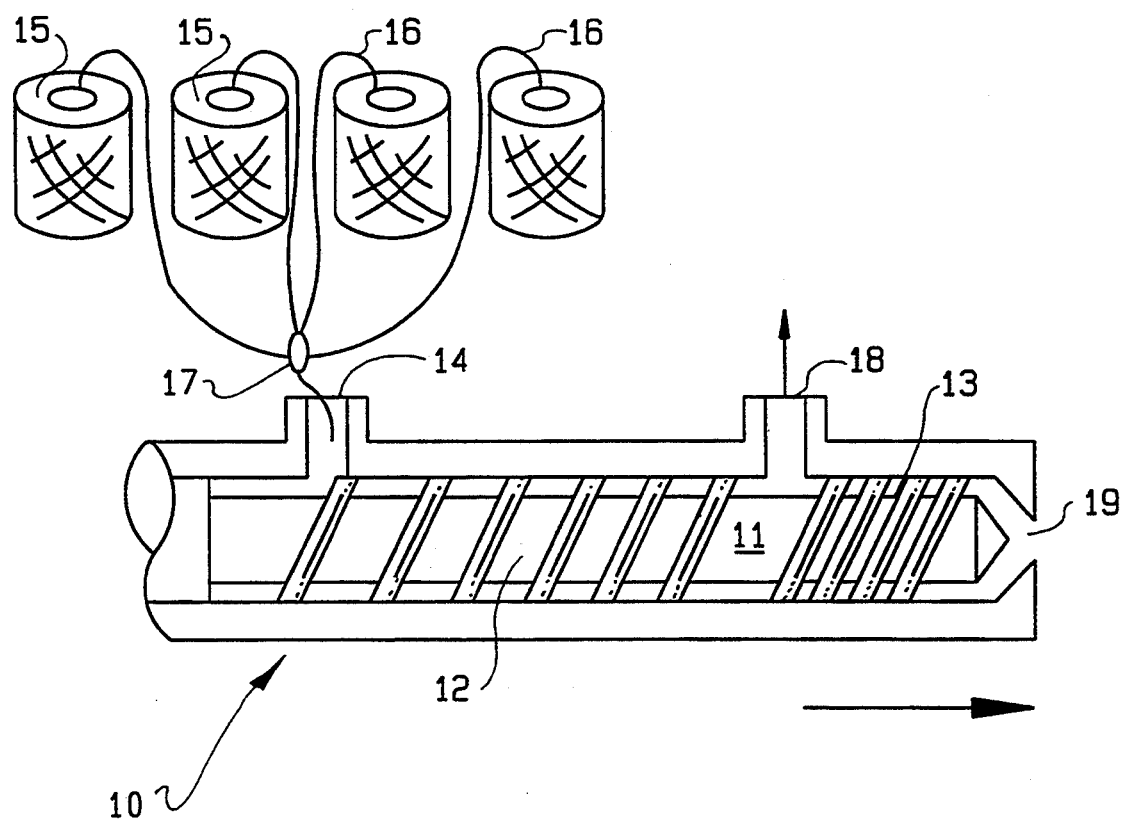

PROCESS FOR MANUFACTURING A COMPOSITE PRODUCT BY MOULDING

FIELD OF THE INVENTION

The present invention relates to a process for manufacturing by moulding a composite product substantially formed of a thermoplastic organic material and reinforcing fibres. More precisely it relates to an extrusion or injection moulding process performed by a device which is supplied with thermoplastic organic material and reinforcing fibres, in particular glass fibres.

For the sake of brevity, the term organic material in the following text is synonymous with thermoplastic organic material.

BACKGROUND

Manufacturing profiled parts obtained by extruding organic material and reinforcing fibres, such as glass fibres, through a die plate and manufacturing objects obtained by injecting these same constituents into a mould encounter the same difficulties when the said constituents are mixed: firstly, the mixture of the organic material and the reinforcing fibres must be as homogeneous as possible before the moulding operation; secondly, it is desirable that the reinforcing fibres impart the best mechanical properties to the composite product manufactured and, to this end, it is in particular desirable to avoid the fibres breaking to too great an extent.

It is known to perform this mixing operation using an extruder which is formed of a heated cylinder in which a lifting screw is rotated by means of a motor. At the top of one of its ends, this cylinder comprises a hopper of which the base opens directly above the lifting screw. The extruder is fed with organic material and glass fibres via this hopper.

The organic material and the reinforcing fibres, for example glass fibres, can be introduced simultaneously into the hopper in a number of ways:

The organic material is stored in the form of granules in a hopper disposed above a conveyor belt of which the velocity of advance is adjustable; the glass fibres are stored in the form of cut fibres in a further hopper, disposed above a further conveyor belt of which the velocity of advance is also adjustable. These belts discharge their contents into the extruder feed hopper. This method requires the use of heavy or bulky metering devices to maintain the respective proportions of organic material and cut fibres constant.

A second method consists in mixing beforehand the organic material and the cut fibres. This mixture, discharged into a hopper, is conveyed to the extruder feed hopper by a conveyor belt. This method also requires additional equipment for mixing the two constituents.

The extruder can also be fed directly with granules comprising glass fibres coated with organic material. These granules can be obtained by different processes. Thus, patent application EP-A-O 393 532 recommends impregnating the glass fibres under pressure and then cutting them into pieces.

A variant is mentioned in patent application EP-A-O 367 661. It consists in coating the filaments of a composite fibre with an organic finish before it is exposed to actinic radiation. The aim thereof is to impart cohesion to the composite fibre which can then be cut into sections by a cutting machine.

Introducing the organic material and glass fibres into the extruder at two different points is also known. The organic material is introduced in the form of granules, upstream of a double lifting screw, in the same manner as in the first process described above. The glass fibres are introduced into the extruder downstream of the area in which the organic material is mixed and melted. They are introduced in the form of continuous fibres, extracted from one or more rolls disposed on a creel. A process of this type is described in U.S. Pat. No. 3,304,282 for example.

The factor common to these various processes is that they are performed by very long extruders equipped with profiled screws which in some cases are complex.

The aim of the single or double lifting screw upstream of the extruder is to mix and melt the granules of organic material which may or may not comprise reinforcing fibres. In order to fulfill this function, the screw can have different profiles depending on the grain size of the organic material used. The helix angle of the screw thread, the depth of the thread, the shape of the screw core, cylindrical or conical, the screw pitch, etc. are all factors which determined the degree of compression and shearing of the organic material.

In addition to the length and complexity of the screw used, it should also be stressed that a large amount of energy is needed to obtain a homogeneous molten mixture.

When the reinforcing fibres are introduced into the extruder mixed with the granules of organic material, these fibres are also subjected to shear stresses causing the material to melt, which results in their breaking up.

This disadvantage could in part be avoided if the reinforcing fibres were introduced into the extruder in the form a continuous fibre, downstream of the area in which the thermoplastic organic material is melted. The reinforcing fibres must in turn be subjected to intense mixing in the molten material in order to be distributed homogeneously in the said material. This operation also causes large-scale breakage of these fibres.

SUMMARY OF THE INVENTION

The present invention proposes to attenuate, or even overcome, given disadvantages presented by the known processes.

The object of the present invention is in particular a process for manufacturing a composite product obtained by the extrusion or injection moulding of a mixture of organic material and reinforcing fibres which enables the organic material to be melted rapidly and the reinforcing fibres to be incorporated therein homogeneously be decreasing their fragmentation rate.

The aim of the invention is achieved by means of a manufacturing process according to which a composite product, formed by combining an organic material, reinforcing fibres such as glass fibres, and optionally mineral materials and organic additives, is obtained by extrusion or injection moulding from an extruder supplied with the said material and the said reinforcement, which consists in at least some of the organic material being introduced into the said extruder in the form of continuous filaments or fibres.

What is to be understood by extruder is an extrusion device in the widest sense of the term.

The organic material can be in the form of filaments which are separate or combined to form one or a plurality of fibres, these filaments or fibres optionally being associated with reinforcing fibres in the form of one or a plurality of continuous composite fibres.

The factor common to all these arrangements or combinations is that the organic material is in the form of continuous filaments, each filament having a diameter which is generally between 10 and 50 microns. In other words, in the process according to the invention, the organic material is in the form of separate elements of diameters which are much smaller than those of the granules conventionally used in the known processes, which are of the order of several millimeters. The material divided in this way has a large exchange surface area enabling the heat transfer to be accelerated. This large surface area encourages friction which causes the material to heat rapidly.

In addition to the above, there is the combined action of the lifting screw and the heated wall of the cylinder in which it rotates, causing the entire mass of the material to heat rapidly. The result thereof is rapid and homogeneous melting of the organic material.

In contrast, when the organic material is introduced into the extruder solely in the form of granules, the material takes longer to heat and it does not melt homogeneously. Some specialists have put forward the theory that the granules subjected to the shear forces and close to the heated cylinder wall melt rapidly while the granules trapped in the screw threads remain in the solid state. Irrespective of the theories formulated for explaining the behavior of the material inside the extruder, it has been observed that the process according to the invention enables the material to melt homogeneously far more rapidly than when known processes are used.

By virtue of the invention, it is thus possible to use extruders of which the lifting screw or screws is/are shorter and of which the profile is simpler than those used hitherto. The cost of an extrusion or injection moulding installation can thus be greatly reduced.

Introducing the organic material in the form of continuous filaments or fibres enables the extruder to be supplied completely constantly, which ensures uniformity of the flow rate of the material as it emerges and thus the constancy of the amount of organic material in the composite subsequently formed.

This uniformity in the supply is achieved simply by the lifting screw or screws entraining the organic material fibres by rotating at a constant velocity.

This supply method is perfectly suited to the manufacture of composite products, irrespective of the proportion of organic material needed for their manufacture. In order to change the proportion of organic material, it is sufficient to modify the number of fibres or filaments of material and/or to select fibres of a different size or even alter the rotational velocity of the lifting screw.

This supply method has the advantage of avoiding the installation of at least certain heavy or bulky metering devices which known processes require. The elimination of devices of this type in a moulding installation employing the process according to the invention enables the cost of such an installation to be further reduced.

The reinforcing fibres, for example glass fibres, are also introduced into the extruder, preferably in the form of continuous fibres.

They can be introduced into the extruder downstream of the area in which the organic material is melted. In this embodiment, the advantages provided by the present invention are restricted to those described above. The breakage of the glass fibres, as a result of the compression and shear stresses to which the said glass fibres are subjected when they are mixed with the organic material, is substantially the same as that achieved when a process of the type described in U.S. Pat. No. 3, 304,282 is used.

The organic material filaments or fibres and the reinforcing fibres are preferably introduced into the extruder via the same inlet. Full benefit is then made of the advantages imparted by the invention.

It is stated above that the organic material melts rapidly and homogeneously and that this enables a shorter lifting screw with a less complex profile than those of the prior art to be used. The ease with which the material melts in particular enables a screw to be used of which the shear effect is low. The reinforcing fibres, introduced at the same time as the material filaments or fibres, are then mixed rapidly with the material mixed by the screw as a result of being subjected to a relatively slight shear.

It is thus possible to obtain a homogeneous mixture in which the reinforcing fibres may be longer than a few millimeters.

The continuous fibres of organic material can be taken from rolls obtained by conventional means: supplying an extrusion head with molten material, then mechanically drawing the material extruded through the orifices provided at the base of the said head. The reinforcing fibres, such as glass fibres, can be introduced into the extruder in the form of cut fibres via the same inlet as the continuous organic material fibres. The length of these cut fibres can be constant or variable depending on whether they are produced by the cutting of continuous fibres by a cutting machine or from the chipping of waste rolls, for example incomplete rolls. The slight shear force imposed on the material in order to melt it, thus restricts the breakage of the cut fibres during the mixing operation. The length of the glass fibres in the final composite product is thus in part preserved.

This embodiment of the invention requires the glass fibres to be cut beforehand, their storage in a hopper and the use of a device which regulates the velocity at which they are introduced into the extruder. The glass fibres can also be cut in situ by a cutting machine fed with continuous glass fibres extracted from rolls. The velocity of the cutting machine can be a parameter for controlling the supply of cut fibres to the extruder.

The invention is preferably implemented using continuous organic material and reinforcing filaments or fibres.

Thus the continuous organic material fibres and the continuous reinforcing fibres can be extracted from separate rolls manufactured previously. The organic material fibres and, for example, glass fibres are combined in a bundle so as to be introduced into the extruder. Depending on the amount of glass required in the composite product, the number of fibres and/or their yarn count are thus mixed for each constituent.

The organic material filaments or fibres and the reinforcing fibres are advantageously introduced into the extruder in the form of a single continuous fibre comprising an accurately defined number of organic material and reinforcing filaments or fibres. Hereinafter this fibre will be known as a composite fibre.

A fibre of this type, for example consisting of material and glass fibres or filaments can be obtained directly be the process describe in patent application EP-A-O 367 661.

The composite fibre preferably used within the scope of the invention compresses the majority of glass filaments in its axis and the majority of organic material filaments on its periphery.

This type of fibre is obtained for example as a result of glass filaments and organic material filaments being drawn simultaneously, the former being in the center of the are defined by the sheet or sheets formed by the latter. The advantage of this arrangement is that it reduces the risk of the glass filaments breaking when they rub against the solid surfaces. This arrangement helps to provide composite parts with good mechanical properties.

The organic material constituting the composite fibre can be solely in the form of continuous filaments or partly in the form of a thin layer covering the composite fibre. This covering is obtained by known means, for example by passing the composite fibre along the axis of a covering head supplied with pressurized organic material.

This fibre can be used in the form of cut fibre. The covering compresses and holds the filaments inside the fibre and in addition it is crushed by the cutting blades which partially close the ends of each section within which the glass filaments and organic filaments remain separate.

Depending on the proportion of glass selected to reinforce the final composite part, one or a plurality of composite fibres of which the glass content corresponds to that of the desired part, or a plurality of composite fibres of which the glass content is different but of which the combination enables the desired reinforcement to be attained, can be used.

Although the embodiments described below are less advantageous than those explained, previously, they also form part of the invention.

The organic material can thus be introduced into the extruder partially in the form of granules and partially in the from of continuous fibres or filaments. In this case, the granules and fibres are introduced via two different inlets, the granules being melted upstream of the fibres.

These granules can consist solely of organic material or can contain glass fibres. In the latter case, these can be granules obtained by extrusion in a manner known per se. They can also be granules resulting from the crushing of waste composite objects, such as faulty parts or parts removed from obsolete devices. The latter type of granules enables a material, which, although not biodegradable, would be added to the large amount of environment-polluting domestic and industrial waste, to be recycled.

More generally, irrespective of the embodiment selected, at least some of the organic material can be introduced into the extruder in the form of material colored by an additive.

BRIEF DESCRIPTION OF THE DRAWING

FIG. 1 shows schematically one preferred embodiment of the invention.

DETAILED DESCRIPTION OF THE DRAWING

This FIG. 1 shows in longitudinal vertical section part of the body of an extruder 10. It is fitted with two similar screws rotating in the same direction, although this FIG. 1 only illustrates one of them. This lifting screw has a cylindrical core 11 comprising upstream an area 12 with a tapered or decreasing pitch and downstream an area 13 with a constant pitch.

At the beginning of the area 12, the body of the extruder 10 is provided at the top with an opening 14 used to supply the extruder. In the vicinity of this opening, the rolls 15 of composite fibre are disposed on a creel (not illustrated). The composite fibres 16 are taken from these unwinding rolls and guided by means (not illustrated) to an assembly device 17. This device collects the fibres 16 into a bundle which is introduced into the extruder.

Between the areas 12 and 13, the extruder body compresses at the top an aperture 18 through which the air occluded during the mixing process, can optionally be discharged. This aperture can be connected to a vacuum pump for example to accelerate the discharge of this air.

The essential function of the area 12 is to melt the organic material and incorporate the glass fibres in the molten material. The function of the area 13 is to homogenize the mixture before it is distributed through the end 19. This end can be provided with various equipment depending on the composite product to be manufactured.

Thus this end can be fitted with an extrusion die plate known per se, for example, enabling a continuous profiled part to be produced.

The process according to the invention can thus be applied in the manufacture of a profiled part in the shape of a cylinder generally known as a rod. This profiled part is cooled with water and cut into short fragments known as granules. These granules are the intermediate products generally used as raw material for supplying extrusion or injection moulding devices.

The process according to the invention is applied advantageously in the direct manufacture of a profiled object by extrusion, whether this is an open profiled part or hollow profiled part.

The process according to the invention is also applied advantageously in the manufacture of an object obtained by injection into a mould. The extruder is then provided at its end with a shutter nozzle known per se which provides the connection to the mould. The extruder screw is mobile and held on the side opposite the nozzle by an hydraulic jack. The screw acts in succession as a plastifier screw, a reinforcement mixing screw and then as an injection piston.

All the thermoplastic organic materials which can be converted into continuous fibres can be used within the scope of the invention. These are polypropylenes, polyamides and polyesters, for example.

In addition to the mineral materials used as fillers, for example, organic additives can be introduced into the extruder in order to improve the wetting of the reinforcement and assist its adhesion to the organic material. On occasion they can be polymers onto which molecules having carbonyl groups are grafted chemically. Thus, when the reinforcement is formed of glass fibres, these groups, together with a silane previously deposited on the glass, can produce van der Waals or covalent type bonds. These additives can also allow different polymers to be mixed, for example a recycled polyamide of the known type under the trademark Nylon and composite fibres comprising polypropylene filaments or fibres. A polypropylene marketed by the Eastmann Kodak company under the trademark Epolene E43 can thus be used for example.

We claim:

1. A process for manufacturing a composite product comprising a thermoplastic organic material and reinforcing fibers, wherein said product is obtained by extrusion or injection molding of a blend of said thermoplastic organic material and reinforcing fibers from an extruder, said process comprising the step of introducing at least some of the thermoplastic organic material into the extruder in the form of separate continuous filaments or fibers formed thereof, wherein the diameter of said filaments is between 10 and 50 microns to provide rapid melt homogenization and reduced reinforcing fiber fragmentation.

2. The process according to claim 1 wherein the reinforcing fibers are glass fibers.

3. Process according to claim 1, comprising the step of introducing the continuous thermoplastic organic material fibres or filaments and the reinforcing fibres into the extruder via a common inlet in the extruder.

4. Process according to claim 3, comprising the step of introducing the reinforcing fibres into the extruder in the form of cut fibres.

5. Process according to claim 3, comprising the step of supplying the extruder with said continuous thermoplastic organic material fibres taken from at least one of a plurality of rolls, and further supplying the extruder with continuous reinforcing fibres taken from at least one of a plurality of other rolls.

6. Process according to claim 1, comprising the step of introducing the continuous thermoplastic organic material fibres or filaments and reinforcing fibres, in a form of continuous fibres, into the extruder via two different inlets in the extruder the latter fibres being introduced downstream of the inlet of the former fibres.

7. Process according to claim 1, comprising the step of feeding the extruder with at least one composite fibre formed by a combination of continuous glass filaments and continuous thermoplastic organic material filaments.

8. Process according to claim 7, comprising the step of feeding the extruder with at least one composite fibre, of which some of the thermoplastic organic material is in the form of a layer covering said composite fibre.

9. Process according to claim 7, comprising the step of feeding the extruder with at least one composite fibre of which all the thermoplastic organic material is in the form of continuous filaments.

10. Process according to any one of claims 6 to 8, comprising the step of feeding the extruder solely with composite fibre of which the respective proportions of thermoplastic organic material and glass correspond to those of the composite object to be produced.

11. The process according to claim 1 comprising the step of introducing the thermoplastic organic material into the extruder partly in the form of granules and partly in the form of continuous fibers or filaments, the fibers or filaments being introduced downstream of the granules.

12. Process according to claim 11, wherein at least some of the thermoplastic organic material granules introduced into the extruder are granules comprising glass fibres.

13. Process according to claim 12, wherein at least some of the granules comprising the glass fibres are granules resulting from the crushing of waste composite objects.

14. Process according to claim 1, comprising the step of coloring at least some of the thermoplastic organic material with an additive.

15. The process according to claim 1, wherein the composite product formed is a rod which can be cut into granules reinforced with glass fibers.

16. The process according to claim 1 wherein the composite product formed by extrusion is a profiled object reinforced with glass fibers.

17. The process according to claim 1 wherein the composite product formed by injection molding is an object reinforced with glass fibers.

18. The process according to claim 1 wherein substantially all of the thermoplastic organic material is added to the extruder in the form of continuous filaments or fibers.

* * * * *